Jan. 9, 1968     L. H. MOTT     3,362,140

DUST FILTER

Filed Aug. 25, 1964     2 Sheets-Sheet 1

INVENTOR
LAMBERT H. MOTT
BY
Dean, Fairbank & Hirsch
ATTORNEYS

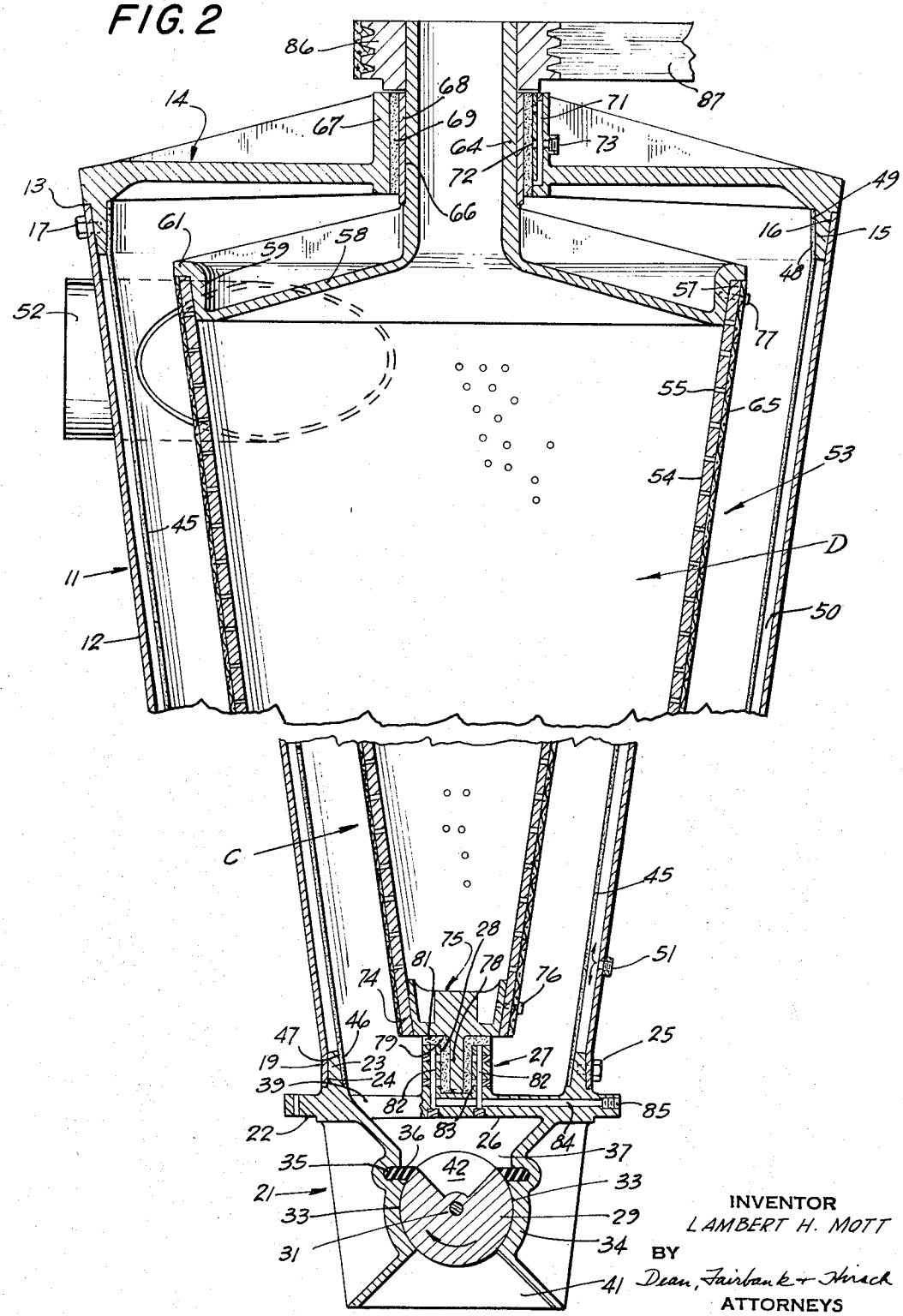

United States Patent Office 3,362,140
Patented Jan. 9, 1968

3,362,140
DUST FILTER
Lambert H. Mott, 270 Huyshope Ave.,
Hartford, Conn. 06114
Filed Aug. 25, 1964, Ser. No. 391,843
7 Claims. (Cl. 55—408)

This invention relates to the art of filters and more particularly to a filter for removing dust particles from air in which they are entrained.

As conducive to an understanding of the invention, it is noted that where a dust filter is employed in a bakery or other manufacturing plant in which the manufacturing process results in the development of small particles or dust, which must be removed either as a health measure or for subsequent re-use and the air with the entrained dust is forced through a filter that will separate the air from the dust, if the filter rapidly clogs, it will not function properly and must be frequently disassembled for cleaning which is relatively time consuming and costly and which may cause disruption of the manufacturing procedures and this problem is much more serious where large quantities of dust are entrained in the air.

It is accordingly among the objects of the invention to provide a dust filter that may readily be fabricated and which will dependably separate even large quantities of solid matter such as dust or other particles from the air in which it is entrained and automatically discharge such solid matter, without need for cleaning of the unit.

According to the invention the filter comprises an outer casing and an inner hollow filter member which is mounted in such casing so that it may rotate at relatively high speed. The dust laden air is forced into the chamber defined by the outer casing and the filter member in a direction opposed to the direction of rotation of the filter member so that it will strike the rotating filter member substantially longitudinally thereof, the solid particles falling to the bottom of such chamber to be intermittently discharged therefrom and the filter air being discharged from the upper end of the filter member.

In the acompanying drawings in which are shown one or more of various possible embodiments of the several features of the invention, FIG. 1 is a longitudinal elevational view of the filter member;

FIG. 2 is a sectional view on an enlarged scale taken along line 2—2 of FIG. 1;

Figure 1:
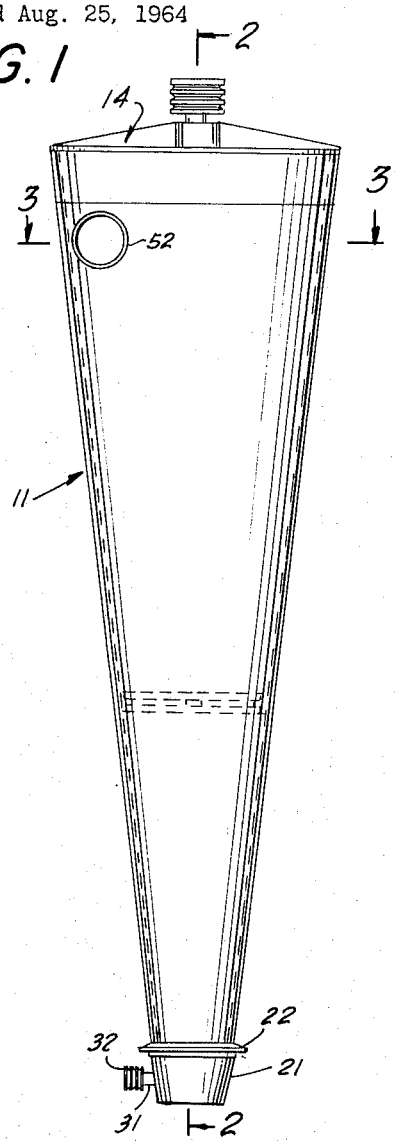

Referring now to the drawings, as shown in FIGS. 1 and 2, the dust filter comprises a casing 11 which comprises a frusto-conical sleeve 12 which forms the side wall of the casing. The large diameter end 13 of the sleeve 12 is closed by a cup-shaped cap 14, the side wall 15 of which has an annular recess 16 to accommodate such end 13 which is secured thereto by screws 17.

The small diameter end 19 of the sleeve is closed by a valve casing 21 which comprises a body portion having an outstanding annular flange 22 with an annular hub 23 rising therefrom, the hub having an annular recess 24 in its outer surface to accommodate the end 19 which is secured to the hub by screws 25.

The valve casing 21 has a transverse wall 26 at its upper end with a plurality of openings 39 therein and from the axis of which rises socket 27 which has an axial cavity 28 therein.

Extending transversely through the casing 21 is a cylindrical valve member 29 rotatably mounted on a shaft 31 to the outer end of which a pulley 32 (FIG. 1) is mounted for rotation of said valve member.

The valve member 29 is positioned between opposed arcuate recesses 33 in walls 34 formed in the interior of the casing 21 which is preferably cast as an integral unit. The upper portion of each wall 34 above the arcuate recess 33 therein has a recess 35 extending parallel to the shaft 31 and each recess 35 has a resilient sealing strip 36 positioned therein which engages the periphery of the cylindrical valve member 29 to define an airtight seal.

The portion of the valve casing above the valve member 29 defines a collecting chamber 37 in communication with the interior of the casing 11 through the openings 39 in wall 26 and the portion of the valve casing below the valve member 29 defines a discharge outlet 41.

As is clearly shown in FIG. 2, the valve member 29 has a cavity 42 therein between its ends which is moved into alignment with the collecting chamber 37 as the valve member 29 is rotated, to convey material from the chamber 27 to the discharge outlet 41.

Positioned in the casing 11 is a rigid frusto-conical sleeve 45 of porous material which may be a porous screen or of sintered metal. The lower end 46 of sleeve 45 is seated in an internal annular recess 47 in hub 23 and the upper end 48 of the sleeve is seated in an internal annular recess 49 in side wall 15 of the cap 14, the space between the sleeves 12 and 45 defining a plenum chamber 50 which has an inlet port 51.

In order to permit dust laden air, for example, to be forced into the casing 11, an inlet is provided at the upper end of sleeve 12, said inlet being defined by a pipe 52 that extends through the sleeves 12 and 45 substantially tangentially of the spacing 11.

Positioned in the casing 11 and rotatably mounted therein is a porous filter member 53 which extends substantially the length of the casing 11.

Figure 4:
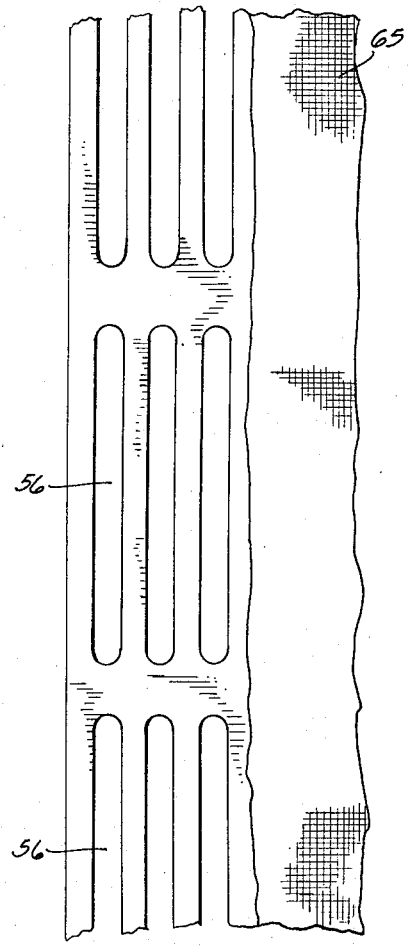
FIG. 4 is a fragmentary detail view with parts broken away showing another embodiment of the filter member.

As is clearly shown in FIG. 2, the sleeve comprising a rigid frusto-conical sleeve 54 which may be of aluminum, plastic or the like and which preferably extends parallel to sleeve 45 at an angle of say 15 degrees from the horizontal. The sleeve 54 has a plurality of perforations 55 therethrough as shown in FIG. 2 or may have a plurality of slots 56 therethrough as shown in FIG. 4. The enlarged upper end 57 of the sleeve 54 is closed by a cap 58 which has an upstanding periphery flange 59 positioned in the end 57, said flange having an outwardly extending annular lip 61 at its free end which abuts against the end 57 of the sleeve 54.

Encompassing the rigid sleeve 54 is a second frusto-conical sleeve 65 of porous material such as sintered metal or a porous screen may be used, in either case the passageway through the porous sleeve 65 being of dimension such as to permit passage of gas therethrough but to lock passage of solids such as dust particles.

The cap 58 has an axial hollow stem 64 rising therefrom which provides communication to the interior of the chamber D defined by the rigid sleeve 54. The stem 64 extends through an axial opening 66 defined by a cylindrical extension 67 preferably integral with the cap 14.

The stem 64 is encompassed by a bushing 68 which is secured thereto and which is encompassed by a porous sleeve 69 illustratively of sintered metal which is secured to the cylindrical extension 67.

As is shown in FIG. 2, the wall of cylindrical extension 67 has a vertical bore 71 with transverse passageway 72 providing communication to the porous sleeve 69 and an inlet port 73 leads into the vertical bore 71.

The lower end 74 of the filter member 53 has a hub 75 positioned therein which is retained in place by screws 76 extending through the sleeves 54 and 65, said sleeves being secured at their upper ends to the annular flange 59 of cap 14 by screws 77. The hub 75 has a depending axial stud 78 which is positioned in the vertical bore of a porous sleeve 79, preferably of sintered metal which is positioned in cavity 28 of socket 27. The sleeve 79 has an annular flange 81 resting on the upper end of socket 27 and on which is seated the undersurface of hub 75.

The wall of socket 27 has vertical bores 82 in communication with transverse bores 83 which in turn are in communication with the porous sleeve 79, the outer ends of the transverse bores 83 being blocked. A transverse bore 84 extends through the transverse wall 26 and is in communication with the vertical bores 82, said transverse bore 84 having an inlet port 85.

To rotate the filter member 53, a pulley 86 is secured to the protruding outer end of stem 64 and is rotated by a belt 87 driven by a suitable motor (not shown).

In the operation of the filter, a source of air under pressure is applied to the ports 51, 73 and 85. As a result of the air flow through the porous sleeves 69 and 79, friction between the bushing 68 and sleeve 69 and between stud 78 and sleeve 79 will be minimized. In addition, there will be a minimum of friction between the undersurface of hub 75 and the flange 81 of sleeve 79.

Figure 3:
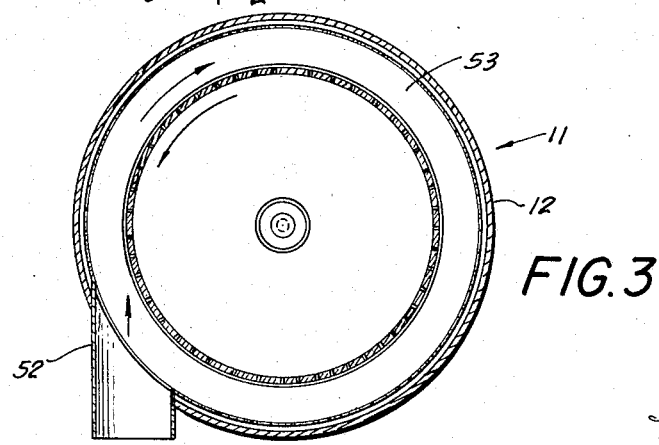
FIG. 3 is a sectional view on an enlarged scale taken along line 3—3 of FIG. 1.

The filter member 53 is then rotated at relatively high speed which may be in the order of 10,000 r.p.m. in a counterclockwise direction, referring to FIG. 3 and the dust laden air which may be from a bakery, for example, is forced into the casing through inlet pipe 52 at the upper end of the unit. It is to be noted that the dust laden air is forced into the housing in a direction opposed to the direction of rotation of the filter member and will strike the latter substantially tangentially thereof.

Due to the rotation of the filter member 53, a vortex will be created that will develop a low pressure area in the center of the filter member. As the pressure in the chamber C between the sleeve 45 and the filter member 53 would be greater than the pressure in the interior of the filter member, there will be a flow of air from the chamber C through the porous wall of the filter member into the interior of the filter member and by reason of the vortex therein the air would rise to be expelled through stem 64.

Due to the porous sleeves 65 on the outer surface of the filter member 53, only air will flow therethrough and the dust or particles entrained with the air will be restrained by the outer surface of such sleeve 65.

However, as soon as the dust or particles abut against the porous sleeve 65, by reason of the rapid rotation thereof, such particles will be hurled outwardly by centrifugal force, thereby automatically cleaning the outer surface of the porous sleeve 65.

By reason of the fact that the dust laden air is forced into the chamber C under pressure and as it will strike the outer surface of sleeve 65 tangentially thereof since the direction of movement of the dust laden air is opposite to the direction of rotation of the filter member 53, any particles that tended to remain on the porous surface 65 of the rotating filter member 53 will be dislodged therefrom by the impact of the particles entrained with the air forced into the chamber C.

As the air forced into the plenum chamber 50 will flow through the porous sleeve 45 forming the inner wall thereof, a film of air will be provided on the surface of sleeve 45 exposed in chamber C which will facilitate the falling of the particles down to the bottom of the chamber C where they will be discharged through the openings 39 in wall 26 into collecting chamber 37.

As the valve member 29 is also rotating, each time the recess 42 thereof is aligned with the collecting chamber 37, it will fill and with rotation of the valve member 180 degrees, the recess 42 will become aligned with the outlet port 41 for discharge of the dust or particles from the unit.

With the equipment above described, highly efficient filtering of particles from the air in which it is entrained may be accomplished. As the stream of particle laden air is forced into the casing at the upper end thereof, the particles will tend to follow a helically downward path to the lower end of the casing chamber for discharge therefrom. By reason of the film of air on the inner surface of the porous sleeve defining the inner surface of the casing wall, the particles will readily flow downwardly. Any tendency of the particles to adhere to the filter member is eliminated by the fact that the latter is rotating in direction opposed to direction of flow of the stream of air. Hence, the particles that did tend to stick against the sleeve 65 will be dislodged by the other particles abutting thereagainst. By reason of the rotation of the filter member, in addition to creating a low pressure area in the center thereof, the air will rise rapidly for discharge through the hollow stem 64.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A filter comprising an elongated substantially frusto-conical casing having a side wall, a porous inner wall in said casing spaced from said side wall and defining a plenum chamber with respect thereto, said porous inner wall defining the inner surface of said casing, means to apply gas under pressure into said plenum chamber for discharge through said porous inner wall, a hollow elongated substantially frusto-conical filter member positioned in said casing and extending longitudinally thereof, said filter member defining a chamber with respect to the inner surface of said casing, said filter having its upper end at its larger diameter portion and its lower end at its smaller diameter portion, said casing having an inlet at its upper end extending at substantially right angles to the longitudinal axis of the casing and positioned to direct a stream of particle laden air under pressure against the inner surface of said casing and against said filter member substantially tangentially thereof, said filter member having an outlet at its upper end, means rotatably mounting said filter member in direction opposed to the direction of flow of the stream of particle ladened air to create a vortex therein to develop a low pressure area in the center thereof, whereby air will be drawn from said chamber through the filter member to the interior thereof and be discharged through said outlet and the particles entrained with the air will be restrained by the filter member and drop to the lower end of the casing chamber and means to discharge the particles collected in said chamber.

2. The filter recited in claim 1 in which said frusto-conical member has a cap secured to the upper end thereof to close the latter, a valve casing is secured to the lower end of said frusto-conical casing, said valve casing having a transverse wall adjacent the upper end thereof, and a valve member rotatably mounted on an axis extending at right angles to the longitudinal axis of the frusto-conical casing, said valve member having a cavity therein, said valve member and said transverse wall defining a collecting chamber therebetween, said wall having openings providing communication between said casing chamber and said collecting chamber, whereby upon rotation of said valve member said cavity will be successively filled by the material collected in the collecting chamber for discharge from the filter with further rotation of said valve member, said wall having an inwardly extending axial socket, said filter member having axial extensions at each end, said cap having an axial opening through which extends the axial extension at the upper end of the filter and said socket having a cavity to receive the axial extension at the lower end of the filter.

3. The filter recited in claim 2 in which the axial extension at the upper end of the filter is a hollow tube defining the outlet of the filter member.

4. The filter member recited in claim 2 in which an air bearing is provided for each of said axial extensions.

5. The filter member recited in claim 4 in which said air bearing comprises a hollow sleeve in which each of said axial extensions is positioned and means to provide air under pressure to the exterior of each of said porous sleeves.

6. The combination set forth in claim 1 in which the filter member comprises a frusto-conical sleeve of rigid material having a plurality of perforations therethrough and a second frusto-conical member of sintered material encompasses said rigid sleeve.

7. The combination set forth in claim 1 in which the filter member comprises a frusto-conical sleeve of rigid material having a plurality of slots therethrough and a second frusto-conical member of sintered material encompasses said slotted sleeve.

References Cited
UNITED STATES PATENTS

| | | | |
|---|---|---|---|
| 1,841,556 | 1/1932 | Stelz | 55—459 X |
| 1,975,335 | 10/1934 | Smith | 55—400 X |
| 2,511,967 | 6/1950 | Campbell | 55—410 X |
| 2,683,635 | 7/1954 | Wilcox. | |
| 2,747,687 | 5/1956 | Carter | 55—408 |
| 2,795,292 | 6/1957 | Richards | 55—408 |
| 2,804,168 | 8/1957 | Church | 55—302 |
| 2,855,249 | 10/1958 | Gerard. | |
| 2,857,979 | 10/1958 | Van Dijck | 55—523 X |
| 2,999,563 | 9/1961 | Wehn | 55—435 X |
| 3,070,407 | 12/1962 | Hughes. | |
| 3,219,394 | 11/1965 | Moss et al. | 55—337 |
| 3,241,676 | 3/1966 | Neuville et al. | 55—400 X |

FOREIGN PATENTS

| | | |
|---|---|---|
| 518,375 | 3/1953 | Belgium. |
| 410,864 | 3/1925 | Germany. |
| 717,848 | 11/1954 | Great Britain. |
| 817,607 | 8/1959 | Great Britain. |

HARRY B. THORNTON, *Primary Examiner.*

FRANK W. LUTTER, *Examiner.*

S. SOKOLOFF, *Assistant Examiner.*